(12) United States Patent
Pham

(10) Patent No.: US 7,561,072 B2
(45) Date of Patent: Jul. 14, 2009

(54) INTERACTIVE SEQUENTIAL KEY SYSTEM TO INPUT CHARACTERS ON SMALL KEYPADS

(76) Inventor: Don Pham, 1851 Lake Shore Cir., Longwood, FL (US) 32750

( * ) Notice: Subject to any disclaimer, the term of this patent is extended or adjusted under 35 U.S.C. 154(b) by 0 days.

(21) Appl. No.: 11/942,011

(22) Filed: Nov. 19, 2007

(65) Prior Publication Data
US 2008/0062016 A1    Mar. 13, 2008

Related U.S. Application Data

(63) Continuation-in-part of application No. 11/383,605, filed on May 16, 2006.

(60) Provisional application No. 60/685,297, filed on May 31, 2005, provisional application No. 60/860,024, filed on Nov. 20, 2006, provisional application No. 60/964,026, filed on Aug. 8, 2007.

(51) Int. Cl.
*H03M 11/00* (2006.01)

(52) U.S. Cl. ............... 341/23; 341/21; 341/176; 345/160; 345/166; 379/90.01

(58) Field of Classification Search ........... 341/23, 341/21, 176; 345/160, 168; 379/90.01
See application file for complete search history.

(56) References Cited

U.S. PATENT DOCUMENTS

| | | | |
|---|---|---|---|
| 3,967,273 A | 6/1976 | Knowlton | |
| 4,658,417 A | 4/1987 | Hashimoto et al. | |
| 5,117,455 A | 5/1992 | Danish | |
| 5,124,940 A * | 6/1992 | Lapeyre | 708/146 |
| 5,339,358 A | 8/1994 | Danish et al. | |
| 5,392,338 A | 2/1995 | Danish et al. | |
| 6,016,142 A | 1/2000 | Chang et al. | |
| 6,320,942 B1 | 11/2001 | Chang | |
| 6,765,556 B2 | 7/2004 | Kandogan et al. | |
| 6,802,661 B1 | 10/2004 | Lee et al. | |
| 6,847,706 B2 | 1/2005 | Bozorgui-Nesbat | |
| 2005/0099397 A1 | 5/2005 | Ono | |
| 2006/0279433 A1 * | 12/2006 | Cui et al. | 341/22 |

* cited by examiner

*Primary Examiner*—Daniel Wu
*Assistant Examiner*—Sisay Yacob
(74) *Attorney, Agent, or Firm*—Christine Q. McLeod; Beusse Wolter Sanks Mora & Maire, PA

(57) ABSTRACT

This invention discloses an interactive sequential system to input letters of the English alphabet and of many world languages, numbers, punctuation marks and many other symbols on keypads with few buttons. The invention includes a device for receiving input characters from a user, having a keypad with a plurality of keys arranged in rows and columns forming a keypad array; a display screen showing a plurality of character sets arranged in rows and columns forming a character set onscreen array wherein each element in the character set array is mapped to each element in the keypad array; and a processor for receiving a selection of one of the plurality of keys on the keypad to designate a character set by its corresponding location coordinate as mapped on the keypad array. Sequential key selection drills down through nested arrays.

26 Claims, 7 Drawing Sheets

INTERACTIVE SEQUENTIAL KEY SYSTEM TO INPUT CHARACTERS ON SMALL KEYPADS

RELATED APPLICATIONS

This application is a continuation-in-part application and claims the benefit of U.S. application Ser. No. 11/383,605, filed May 16, 2006, claiming priority to U.S. Provisional Application No. 60/685,297, filed on May 31, 2005; This application also claims the benefit of U.S. Provisional Application No. 60/860,024, filed on Nov. 20, 2006, and 60/964,026, filed on Aug. 8, 2007, all of which are incorporated herein by reference in their entireties.

FIELD OF THE INVENTION

The invention relates to methods and apparatus to input characters when the number of buttons on a keypad is less than the number of characters.

BACKGROUND OF THE INVENTION

U.S. Pat. Nos. 5,392,338 and 4,658,417 set the standard method of inputting an alphabet via the phone keypad, in which pushing a button one or more times during some period enters a character. The method is simple and easy to learn but is slow and limited in the number of characters.

The most promising system to bypass the disadvantages of the above multipress method is the two-key system, in which each character is entered via two buttons, pressed simultaneously or sequentially. Typewriter and computer keyboards have always used the two-key system. Capitalization, for example, is accomplished by simultaneously pressing a shift button and another button. Most computer applications support control actions on simultaneously pressing a control button and another button, and many also allow menu selection by sequentially pressing an alt button and then typing another button. The two-key system is also used to input non-English letters in some languages.

People have patented many variations of the two-key systems on small keyboards, such as U.S. Pat. Nos. 6,847,706; 6,802,661; 6,765,556; 5,392,338; 5,339,358; 5,117,455; 4,658,417; 3,967,273, all of which are incorporated herein by reference.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF SUMMARY OF THE INVENTION

This invention discloses an interactive sequential key system to input characters of many writing scripts. The system is easy to learn and may be used on portable devices such as PDAs, handheld computers, handheld text-messaging devices and telephones. This invention builds on four observations. First, the human mind can quickly recognize and process information when it is displayed in nine or fewer chunks at a time. Second, a writer can identify the location of a letter more quickly if it is presented in alphabetical order than in random or QWERTY order. Third, the mind can identify the location of a group of symbols more quickly if the symbols are grouped by similar shapes or functions. And fourth, keys on handheld devices are typically small and the symbols printed on the keys are frequently obscured by fingers.

For ease of reference, as used throughout the specification, the representation {CHAR} means a set of no letters, one letter or many characters. For example, { } represents an empty set; {A} represents the set of the single letter A; and {A,B,C,D,E,F} represents the set of the letters A, B, C, D, E and F. Moreover, {CHAR}(R, C) represents the character set at row R and column C. Similarly, key(R, C) represents the key at row R and column C.

The invention includes a device for receiving input characters from a user, comprising a keypad with a plurality of keys arranged in rows and columns forming a keypad array; a display screen showing a plurality of character sets arranged in rows and columns forming a character set array wherein each element in the character set array {CHAR}(R, C) is mapped to each element in the keypad array key(R, C); and a processor for receiving a selection of one of the plurality of keys on the keypad to designate a character set by its corresponding location coordinate as mapped on the keypad array.

Typing a letter involves interactively selecting a first character set from a character set array displayed on the display screen by pressing the corresponding button on the keypad and then selecting a second character set from a second character set array displayed on the display screen by pressing the corresponding button on the keypad. In some cases, selecting a third character-set from a third character-set displayed on the display screen is also needed.

The invention can be implemented in numerous ways, including as a system, a device, a method, or a computer readable medium. Several embodiments of the invention are discussed below.

As a device for receiving an input character from a user, the invention generally includes a keypad comprising a plurality of keys arranged in rows and columns forming a keypad array; a display operable to display an onscreen array comprising a plurality of elements arranged in rows and columns, wherein each element of the onscreen array is coordinately mapped to a corresponding key in the keypad array; a processor for receiving an input character by populating the onscreen array with a plurality of character sets as elements of the onscreen array, wherein each character set comprises a plurality of characters; receiving a first user selection from the keypad to select one of the character sets mapped to the first user selection; populating the onscreen array with a plurality of characters from the selected one of the character sets as elements of the onscreen array; and receiving a second user selection from the keypad to select one of the characters mapped to the second user selection as the input character.

As a method for receiving an input character from a user, the invention generally includes providing a keypad comprising a plurality of keys arranged in rows and columns forming a keypad array; displaying an onscreen array comprising a plurality of elements arranged in rows and columns, wherein each element of the onscreen array is coordinately mapped to a corresponding key in the keypad array; receiving an input character by populating the onscreen array with a plurality of character sets as elements of the onscreen array, wherein each character set comprises a plurality of characters; receiving a first user selection from the keypad to select one of the character sets mapped to the first user selection; populating the onscreen array with a plurality of characters from the selected one of the character sets as elements of the onscreen array; and receiving a second user selection from the keypad to select one of the characters mapped to the second user selection as the input character.

As a computer program product for receiving an input character from a user, the computer program product comprising a computer readable storage medium and a computer program mechanism embedded therein, the computer program mechanism generally includes instructions for displaying an onscreen array comprising a plurality of elements arranged in rows and columns, wherein each element of the onscreen array is coordinately mapped to a corresponding key in a keypad array of a keypad; receiving an input character by populating the onscreen array with a plurality of character sets as elements of the onscreen array, wherein each character set comprises a plurality of characters; receiving a first user selection from the keypad to select one of the character sets mapped to the first user selection; populating the onscreen array with a plurality of characters from the selected one of the character sets as elements of the onscreen array; and receiving a second user selection from the keypad to select one of the characters mapped to the second user selection as the input character.

Additional features may include one or more of providing a mode selection for selecting a writing script mode comprising one or more languages or functions; populating the characters and character sets for each language in the onscreen array in accordance with a convention for reading directions of the language; outputting a pre-selection indication upon receiving a pre-selection input from the keypad, wherein the pre-selection input comprises an input to the keypad distinguishable from the user selection; and predictive text functionality comprising displaying one or more text prediction icons to the user and allowing user selection of one of the text prediction icons by coordinately mapping the icons to a corresponding key on the keypad array.

Thus, by selecting a key on a physical keypad interface (keypad or touchscreen), the user provides input/commands to the device (e.g., input). The physical key selections correspond to selecting elements of the onscreen array (i.e., the icons displayed on the display as a keypad image). Each key in the physical keypad array is coordinately mapped to each element of the onscreen array resulting in a positional relationship between keys on the physical keypad interface and icon positions (array elements) on the keypad image (onscreen array)—e.g., the upper left key on the physical keypad corresponds to the upper left key icon in the keypad image. The user may select the respective key icon of the keypad image in the display by pressing down on the physical keypad interface.

BRIEF DESCRIPTION OF THE DRAWINGS

A more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

This invention discloses an interactive sequential key system to input characters of many writing scripts. In a first embodiment, the invention comprises a device (such as a mobile phone, PDA, Ipod® device, or other device, especially those with limited keys for data entry) for receiving an input character from a user. The device includes a keypad comprising a plurality of keys arranged in rows and columns forming a keypad array (such as a cell phone keypad with 3 columns and 2-4 rows); a display (e.g., grayscale or color LCD) operable to display a graphical user interface which, in this embodiment, is represented as an onscreen array comprising a plurality of elements arranged in rows and columns, wherein each element of the onscreen array is coordinately mapped to a corresponding key in the keypad array. So, for example, if the onscreen array has 3 columns and 2 rows, the elements of the onscreen array are mapped to 3 columns and 2 rows of keys on the keypad having the same relative coordinate location.

The "keys" for user input can be physical buttons (physical keypad) or buttons on touch-sensitive screens (touchscreens—display overlays which have the ability to display and receive information on the same screen) and provide the physical keypad interface with the device.

Figure 1:
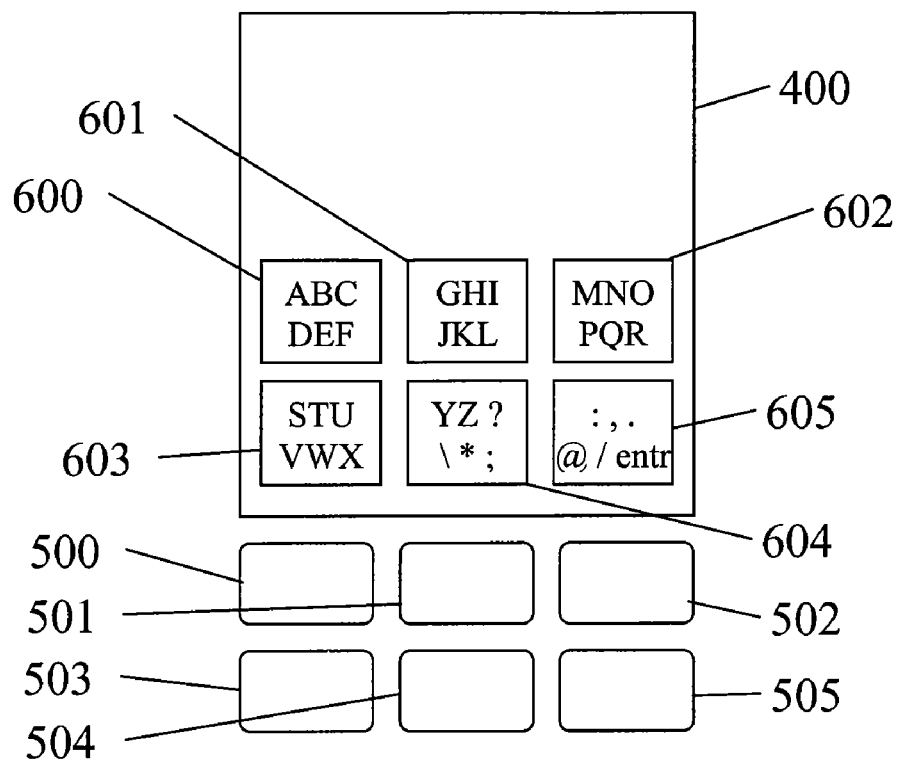
FIG. 1 shows an implementation of the first character-set array to type the English alphabet and various symbols.

The device further includes a processor for receiving an input character by first populating the onscreen array with a plurality of character sets as elements of the onscreen array, wherein each character set comprises a plurality of characters [such as an English language character set shown in FIG. 1 comprising array elements: "abc--def"; "ghi--jkl"; "mno--pqr"; "stuv--wx"; "yz?--\*;"; "(misc. punctuation or commands)". The "--" as used herein merely represents the start of the next row for this example if the contents are displayed as 3 columns and 2 rows]. Then, the processor receives a first user selection from the keypad to select one of the character sets mapped to the first user selection. So, if element 1:1 (i.e., row 1 column 1) of the onscreen array comprises "abc--def", the user can select that element/character set by selecting key 1:1 (i.e., row 1 column 1) on the keypad array. In response thereto, the onscreen array is populated with a plurality of characters from the selected one of the character sets as elements of the onscreen array (See for Example FIG. 7). So, in this example, the array is populated with the contents of the selected "abc--def" character set as individual array elements: "a"; "b"; "c"; "d"; "e"; "f". Then the processor receives a second user selection from the keypad to select one of the characters mapped to the second user selection as the input character. So, if the user wants to select "b", he selects key 1:2 (i.e., row 1 column 2) in order to select element 1:2 (i.e., row 1 column 2), which contains the character "b". Thus, character "b" is input by the user into the device.

In an embodiment, the onscreen array can be graphically designed to simulate an image of a keypad having buttons to represent the elements of the onscreen array. This allows easier user association between the keypad and the onscreen array. The onscreen array can mimic the size, shape, color, layout, and/or design of the keypad or take on its own look and feel. Since the keys on a keypad are usually very small, the array elements can be made larger than the physical keys so that the contents of the array elements can be easily seen by the user, while still preserving the same overall look and feel. The onscreen array may be designed to look like a corresponding "keypad image" graphically designed to appear like buttons/keys similar to the physical keypad interface keys, making the association easier for the user. The displayed icons are preferably arranged in a pattern/array corresponding to a conventional physical keypad for a mobile phone, or the like.

If the onscreen array only uses 6 elements, for example, then these six elements of the onscreen array would be coordinately mapped to only six of the keys available on the keypad, possibly leaving other keys not used and not mapped (which can be mapped or used for other functions). Preferably, the keys chosen to be mapped to the onscreen array comprise the same layout as the onscreen array. In most cases, this would be some combination of columns and rows of elements mapped to similar columns and rows of keys. Row 1 of the keypad would not necessarily need to be mapped to row 1 of the array (for example, you could map two onscreen rows to rows 3 and 4 of a keypad having 4 total rows). The layout could be a matter of design choice as long as the relative locations between the elements/keys are maintained. Alternately, should the onscreen array be designed to mimic a perimeter of keys, only a certain row, only a certain column, skipping a row or column, etc, for example, the key mapping would follow the same layout so the user can associate the onscreen array with the key mapping. In most cases, however, a similar row/column array would suffice, such as an onscreen array having up to six elements arranged in three columns and two rows. To keep with the familiarity of a certain layout, it is preferred that the characters inside the character sets are displayed in a similar manner, such as up to six characters arranged in three columns and two rows (so that the onscreen array appears and functions similar to a nested array).

Since the contents of the onscreen array can be easily updated/changed through software, the device would be able to readily use different onscreen arrays. Thus, one onscreen array could be designed for the English language (See for example FIG. 1) and others for different languages (See for example FIGS. 2-4) (i.e., "writing script"). Similarly, arrays could be designed for other types of functionality such as math functions (See for example FIG. 5) or industry specific functions (real estate math, chemistry symbols, etc.). This invention preferably groups letters of a writing script into character set arrays. Thus, character sets may be designed to correspond to a selected writing script mode comprising one or more languages or functions. The processor could selectively populate the onscreen array with a plurality of writing script mode selections as elements of the onscreen array (See for example FIG. 6), and receive input from the keypad so the user can select one of the writing script mode selections mapped to the received input. Upon receiving the writing script mode selection, the onscreen array populates the onscreen character set according to that mode. Other means for selecting modes of a device, as known in the art, may be utilized by the device to select the writing script mode.

To keep the device simple for users, preferably the characters and character sets for each language are populated in the onscreen array in accordance with a convention for reading directions of the language. So, for English, since left to right, top to bottom is the reading direction, the array is populated in that manner. Preferably, each array element is filled before proceeding to fill the next element. So, if an element holds six characters, then it is filled with six characters before filling the next element. However, when switching between character type (letters, numbers, punctuation), a new element may be populated without completely filling the prior element (see for example, FIG. 13) or the convention of filling the elements may be used as a matter of design, especially where space is a factor. The number of elements in a set and the number of sets in the set array is preferably limited to 6 or less in the embodiments to correspond with 2 rows/3 columns. In grouping alphabetic characters into character sets, the preference is listing in alphabetical order or in groups of similar shapes and functions. In grouping non-alphabetic characters into character sets, the preference is grouping characters of similar shapes and functions.

The onscreen array does not need to fill the entire screen of the display. In most cases, it comprises only a portion of the display, such as the lower half. This would leave room on the screen so that the input character may be output to the display, as well as other display outputs.

The invention displays characters on the screen of the handheld device as a keypad image (onscreen array) representing a first character set array with the relative coordinates of the character sets mapped to the relative coordinates of the keys in the key array. Hence, pressing physical keypad interface key(R, C) results in selecting {CHAR}(R,C) from the character set array. The first character set array may be displayed in such a way as to preserve the alphabetical order of characters or grouping of characters of similar shapes and functions.

After a character set is selected from the first character set array, the display screen shows a second character set array arranged again as a keypad image (onscreen array). Each character set in the second array is a subset of the previously selected character set and preferably has at most one character. An exception for this one-character rule is when a third character-set needs to be selected and this exception will be explained later. The union of all character sets in the second array is the selected character set of the first character set array. The display screen may show character sets in the second array in such a way as to preserve the alphabetical order and the grouping of shapes and functions of the previously selected character set. For example, if the character set selected from the first character set array is {A, B, C, D, E, F}, then the second character set array is {A}, {B}, {C}, {D}, {E} and {F}. The second character set array may be displayed such that the relative coordinates of elements of the array map to the relative coordinates of the key array. Hence pressing key(R,C) results in selecting character set {CHAR}(R,C).

In this manner, typing a character comprises a) examining a first character set array displayed (preferably as a keypad image/onscreen array) on the screen, b) pressing a key on the physical keypad interface to select a first character set containing the desired character, c) examining a second character set array displayed (preferably as a keypad image/onscreen array) on the screen and d) pressing a key on the physical keypad interface to select a second character set containing only the desired character, resulting in character input.

In this manner, it would not matter if the user's fingers block viewing the physical keypad interface itself, because the user looks to the keypad image on the screen for reference. This user interaction is similar to how a user can easily manipulate a mouse on a mouse pad by associating mouse movements with cursor movements on the screen without having to look at the mouse itself. Moreover, since the user need not look at the physical keypad interface, markings on the physical keypad can be eliminated (i.e., the character array does not necessarily need to appear on the physical key itself but, rather, is displayed on the keypad image on the screen). This is advantageous since many physical keypad buttons are too small to adequately print more than a couple of tiny, hard-to-see characters. The keypad image may be enlarged for easier viewing of the characters mapped to each key.

Selecting a character set with only one element results in typing a character or executing a command associated with the character set. Frequently, the character is the same as the element of the character set. For example, selecting character set {A} results in typing character A. However, there are characters that either are not easily displayed or are not easily recognizable on a screen and the character-set must be set to display a related symbol, a word or a phrase. For examples, the characters for return, delete, tab, backspace, space, comma and period may be respectively displayed as "↓", "delete", "tab", "←", "→", "comma" and "period", or the like.

Many writing scripts have letters formed by adding one or more diacritics to a letter. These letters may be grouped into sets either by their diacritical sign or by their letter. Typing such a letter may take more than two key strokes. An option to type a letter with diacritics is to designate a special key. Pressing the key after or before typing a letter turns it into the letter with the diacritics. For example, numeric key 7 can be designated as the special key and pressing it after typing the letter u changes the letter u to umlaut u in German.

Various color schemes may aid in separating characters and character sets displayed on the screen.

When key repeating is enabled, holding a key down when the screen displays the first character set array implies using the same key for the second character set array.

When key repeating is enabled, holding a key down when the screen displays the second character set array implies retyping the same character in the second character set selected.

One way to display character set arrays is to display each character set as a group of characters without separating commas and brackets used for set notation. Hence, the set {A,B,C,D,E,F} may be displayed as ABCDEF and the set {A} may be displayed as A. Blank spaces and tabs may be used to separate character sets.

Another way to display a character-set that has more than one member is to display the members such that their relative positions correspond to the relative locations of the numeric keys of the standard phone keypad in the next keystroke. For example, the set {A,B,C,D,E,F} may be displayed in two rows; the first row shows ABC and the second row shows DEF.

Additional lines and images can also be used to paint character-sets as buttons on the display.

Care should be taken to display characters and character-sets using the reading and writing convention of the language. English, for example, is read from left to right, while Hebrew is read from right to left (See FIGS. 12-14 for example).

In some cases, it is necessary for one or more second character-sets to have many members and they should be displayed in such a way to indicate further selection is needed. Selecting such a second character-set will present a third character-set array, and the relative coordinates of the third character-sets are mapped to the relative coordinates of the keys in the key array.

The invention also proposes a pre-selection mode. Pre-selection functionality may provide an indication upon receiving a pre-selection input from the keypad, wherein the pre-selection input comprises an input to the keypad distinguishable from the user selection. The pre-selection input is distinguishable from the user selection based on key pressure, for example. The pre-selection indication comprises a visual indication of which element of the onscreen array is coordinately mapped to the corresponding key in the keypad array for which the pre-selection input was received. When a finger is lightly placed on a button on the physical keypad interface, the system provides a cue for that button. The cue can be visual by displaying the button with different colors, with a different size or shape, or with special effects. The cue can also be audible by playing a sound, speaking a word or phrase. Providing audible pre-selection cue is especially important for visually challenged users. The pre-selection mode is possible even when buttons are virtual buttons on a touch sensitive display and the button faces are the graphics of the buttons.

Pressing harder on the button results in selecting the button. Providing a selection confirmation by playing a sound or speaking a word or phrase in addition to displaying the selection is an option. The optional feedback is especially important for visually challenged users.

Different methods of detecting pre-selection and selection are possible. For example, a button may have two pressure sensitivity levels; light pressure sensitivity level is associated with pre-selection and high pressure sensitivity level is associated with button selection. Other sensory techniques and combination of techniques are also possible. For example, a form of pre-selection on keypads sensitive to only one detection level may include a technique such that the press provides information about the selection and the second press is the actual selection.

This invention also proposes a method to ease selection in text predictive technology for mobile devices. Traditionally, taking cues from inputted text, a mobile device displays one or more predictive guesses which may be displayed either on the input text line or as a drop-down list. In both cases, selection is by pressing cursor or "select" buttons. Predictive Text functionality may be provided by displaying one or more text prediction icons to the user and allowing user selection of one of the text prediction icons by coordinately mapping the icons to a corresponding key on the keypad array. The invention proposes displaying a key label adjacent to each guess and selecting a guess is by pressing the key associated with the label adjacent to the guess. This association of labels to predictive guesses is feasible because the interactive sequential key system frequently uses 6 of the 12 buttons on the phone keypad, leaving 6 buttons for other functions. With the multi-tap technique, no spare buttons on the phone keypad are available for selecting predictive guesses. Similarly, on mobile devices equipped with "qwerty" keypad, no spare buttons are available for selecting predictive guesses.

When pre-selection mode is active, light pressing of a button triggers cuing of the associated predictive guess. The processor outputs a pre-selection indication upon receiving a pre-selection input from the keypad corresponding to the user selection of one of the text prediction icons. The cue can be audible by reading aloud the predictive guess or visual by displaying the predictive guess with different colors, with a different size or shape, or with special effects. Hard pressing on a button results in selecting the associated predictive guess.

The following naming applies to labels in the figures: 400 is the display screen; the 500s represent the physical keypad interface keys: 500 is key(1,1); 501 is key(1,2); 502 is key(1, 3); 503 is key(2,1); 504 is key(2,2); 505 is key(2,3); 506 is key(3,1); 507 is key(3,2); 508 is key(3,3); 509 is key(4,1); 510 is key(4,2); 511 is key(4,3), the 600s represent the keypad images/icons on the screen: 600 is {CHAR}(1,1); 601 is {CHAR}(1,2); 602 is {CHAR}(1,3); 603 is {CHAR}(2,1); 604 is {CHAR}(2,2); 605 is {CHAR}(2,3); 606 is {CHAR}(3,1); 607 is {CHAR}(3,2); 608 is {CHAR}(3,3); 609 is {CHAR}(4,1); 610 is {CHAR}(4,2); and 611 is {CHAR}(4, 3). As previously mentioned, the keypad image on the screen may be a simple array or may be graphically designed to appear like buttons/keys similar to the physical keypad interface keys, making the association easier for the user.

Pressing key(R, C) results in selecting {CHAR}(R,C). Hence, pressing key(1,1) results in selecting {CHAR}(1,1); pressing key(1,2) results in selecting {CHAR}(1,2); pressing key(1,3) results in selecting {CHAR}(1,3); pressing key(2,1) results in selecting {CHAR}(2,1); pressing key(2,2) results in selecting {CHAR}(2,2); pressing key(2,3) results in selecting {CHAR}(2,3); pressing key(3,1) results in selecting {CHAR}(3,1); pressing key(3,2) results in selecting {CHAR}(3,2); pressing key(3,3) results in selecting {CHAR}(3,3); pressing key(4,1) results in selecting {CHAR}(4,1); pressing key(4,2) results in selecting {CHAR}(4,2); and pressing key(4,3) results in selecting {CHAR}(4,3).

FIG. 1 shows an implementation of a device with a display 400 (such as a screen, LCD, or the like), a physical keypad interface with six keys shown (500-505) (such as a mobile phone or mobile device keypad or a touchscreen keypad or the like), and an image on the screen showing six icons arranged as an onscreen array (600-605), and in this example, graphically designed to appear as a keypad image. The physical keypad interface may actually comprise additional keys, not shown herein. The keys may be larger or smaller than represented. The physical keys may include indicia such as numbers for dialing, (or an array of numbers/letters that is arranged in an ITU Standard E.161 arrangement that most phones built today utilize), or other types of indicia (including the character arrays of the present invention). For the present invention, since a keypad image/onscreen array is displayed to the user on the screen, the indicia printed on the physical keys are immaterial. In this example, the icons of the keypad image (i.e., elements of the onscreen array) on the screen are shown near the bottom of the screen, which may be a desired location in that it is near the physical keypad interface. Other locations on the display area are contemplated herein. The unused portion of the screen may be used to display the output of the character selection, predictive text, or the like. FIG. 1 represents a first character-set array to type the English alphabet and various symbols. Here, the symbol for new line is spelled out as "entr." Symbols are displayed and positioned to facilitate selecting second keystrokes. Framing of the icons on the display also shows character-sets to appear as buttons, making the association easier for the user.

Figure 2:
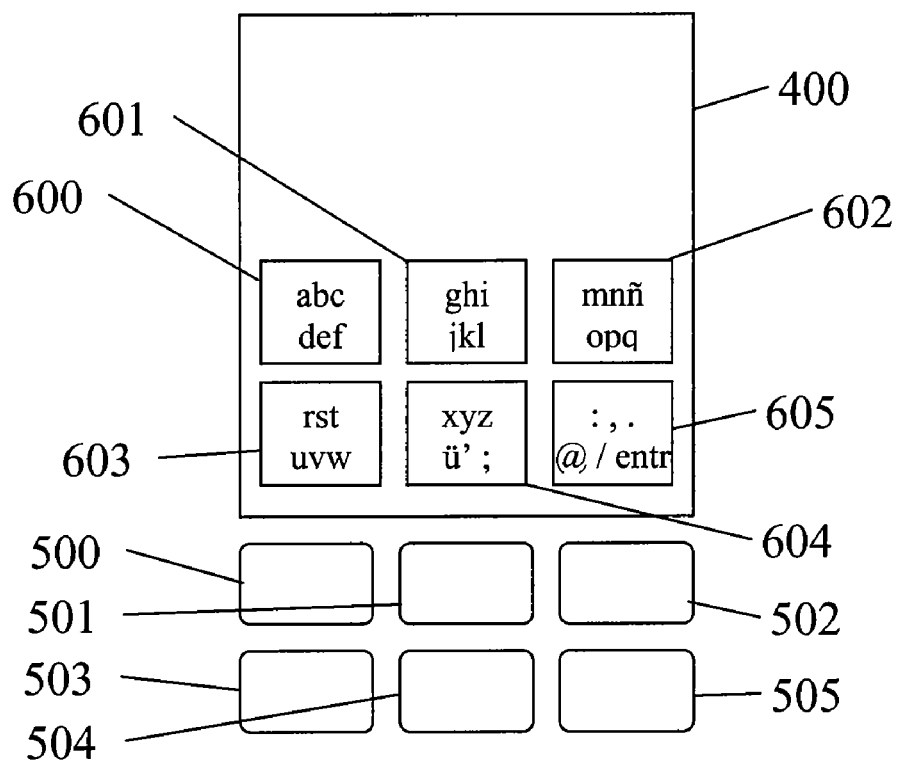
FIG. 2 shows an implementation of the first character-set array to type the Spanish alphabet and various symbols.

FIG. 2 shows an implementation of a device with a display 400, a physical keypad interface with six keys (500-505), and a keypad image on the screen showing six icons arranged as an array (600-605) wherein the first character-set array is designed to type the Spanish alphabet and various symbols. Here, the symbol for new line is spelled out as "entr." Symbols are displayed and positioned to facilitate selecting second keystrokes. Framing also shows character-sets as buttons.

Figure 3:
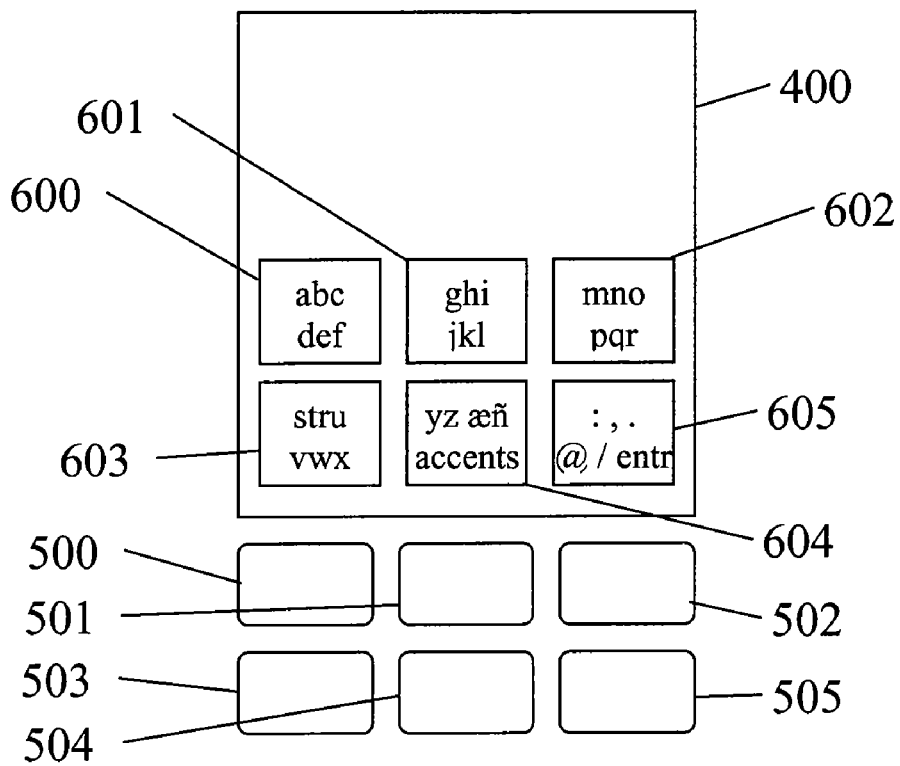
FIG. 3 shows an implementation of the first character-set array to type the French alphabet and various symbols.

FIG. 3 shows an implementation of a device with a display 400, a physical keypad interface with six keys (500-505), and a keypad image on the screen showing six icons arranged as an array (600-605) wherein the first character-set array is designed to type the French alphabet and various symbols. Here, the symbol for new line is spelled out as "entr." Groups of special French letters and symbols are labeled as "accents." Whenever possible, symbols are displayed and positioned to facilitate selecting second keystrokes. Framing also shows character-sets as buttons.

Figure 4:
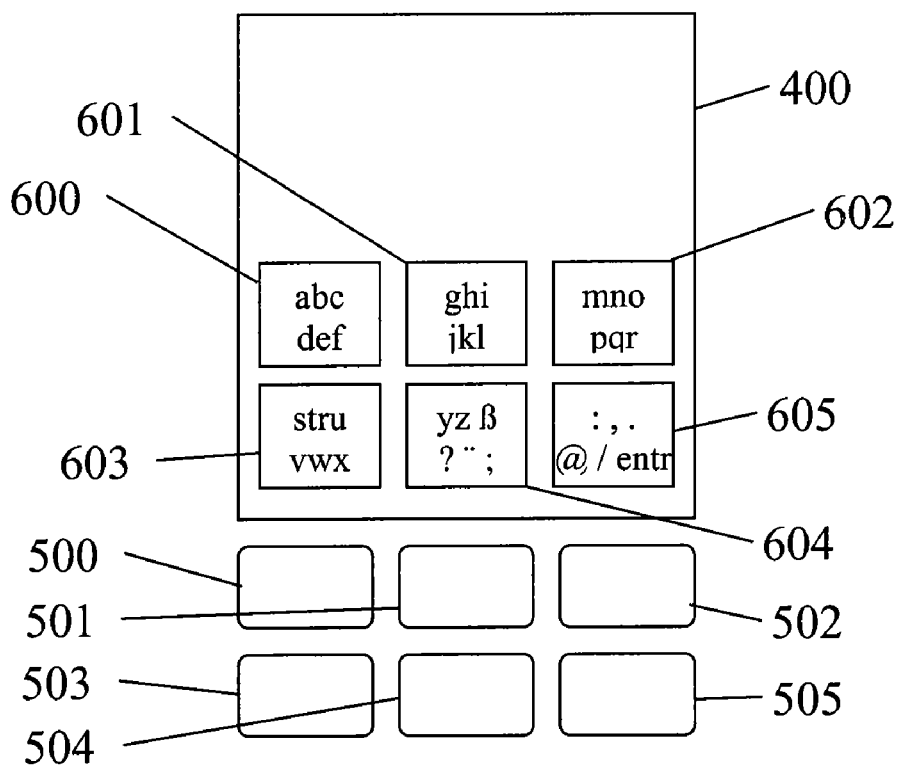
FIG. 4 shows an implementation of the first character-set array to type the German alphabet and various symbols.

FIG. 4 shows an implementation of a device with a display 400, a physical keypad interface with six keys (500-505), and a keypad image on the screen showing six icons arranged as an array (600-605) wherein the first character-set array is designed to type the German alphabet and various symbols. Here, the symbol for new line is spelled out as "entr."Groups of special German letters and symbols are labeled as an umlaut. Whenever possible, symbols are displayed and positioned to facilitate selecting second keystrokes. Framing also shows character-sets as buttons.

Figure 5:
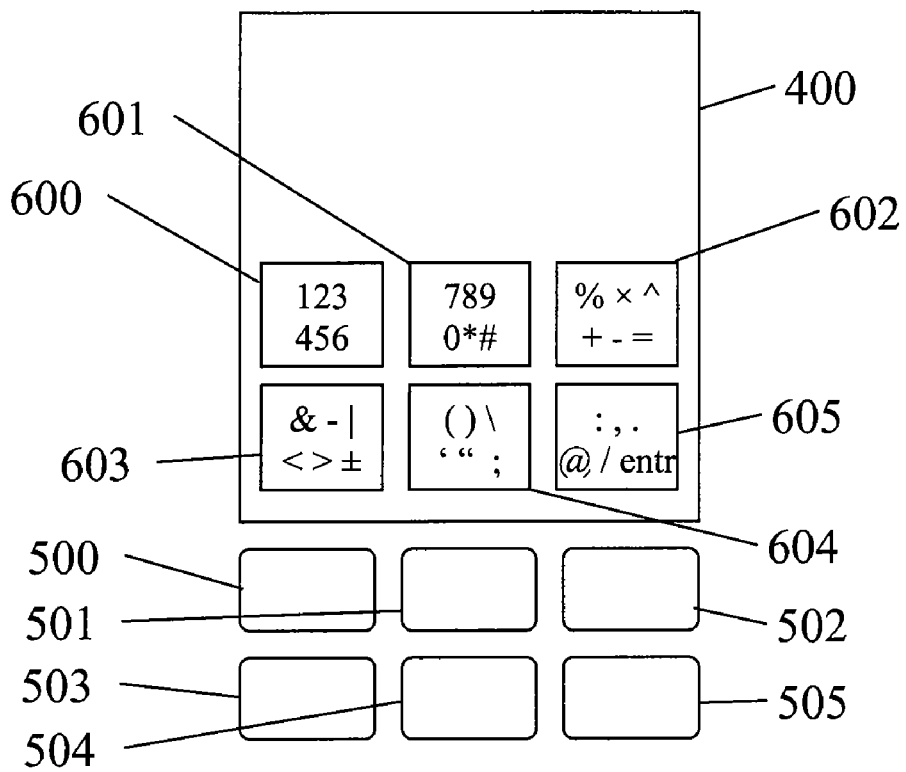
FIG. 5 shows an implementation of the first character-set array to type the mathematical and miscellaneous characters.

FIG. 5 shows an implementation of a device with a display 400, a physical keypad interface with six keys (500-505), and a keypad image on the screen showing six icons arranged as an array (600-605) wherein the first character-set array is designed to type numeral, mathematical and miscellaneous characters. Here, the symbol for new line is spelled out as "entr." Symbols are displayed and positioned to facilitate selecting second keystrokes. Framing also shows character-sets as buttons.

Figure 6:
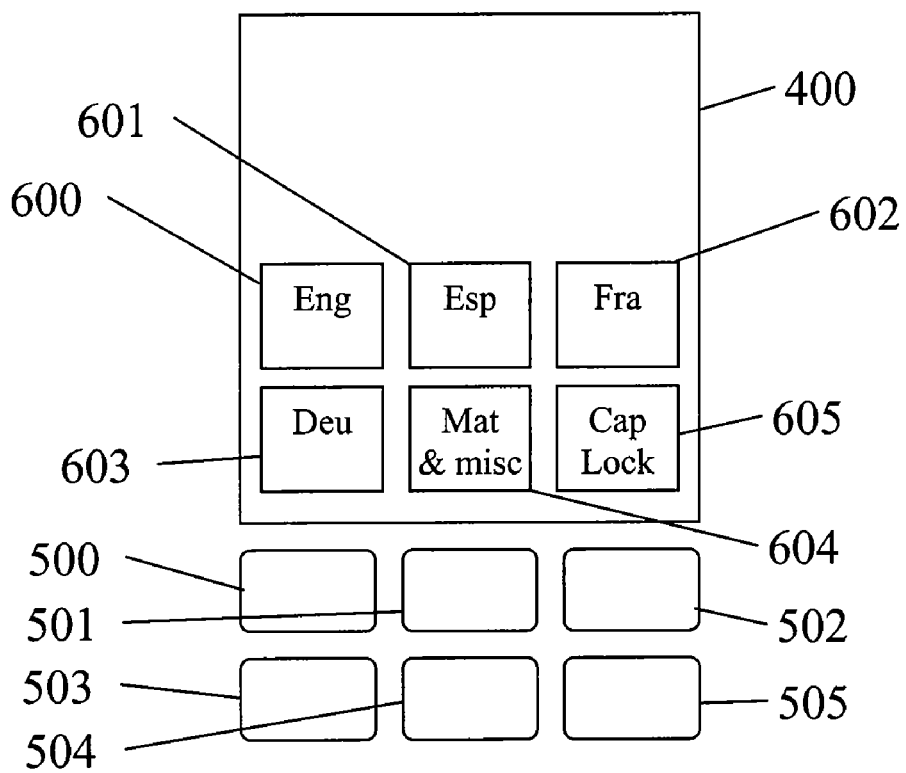
FIG. 6 shows an implementation of an array to select writing scripts.

FIG. 6 shows an implementation of an array to select different writing scripts (modes), such as those shown in FIGS. 1-5, for example. In this example, selecting physical keypad interface key 500 will select icon 600 that represents English language writing script mode (FIG. 1); selecting physical keypad interface key 501 will select icon 601 that represents Spanish language writing script mode (FIG. 2); selecting physical keypad interface key 502 will select icon 602 that represents French language writing script mode (FIG. 3); selecting physical keypad interface key 503 will select icon 603 that represents German language writing script mode (FIG. 4); selecting physical keypad interface key 504 will select icon 604 that represents Math/Misc function mode (FIG. 5). In this example, a button position (505) is reserved for caps lock (icon 605). The arrangement shown in FIG. 6 will allow a user to switch between different languages/implementations/modes.

Figure 7:
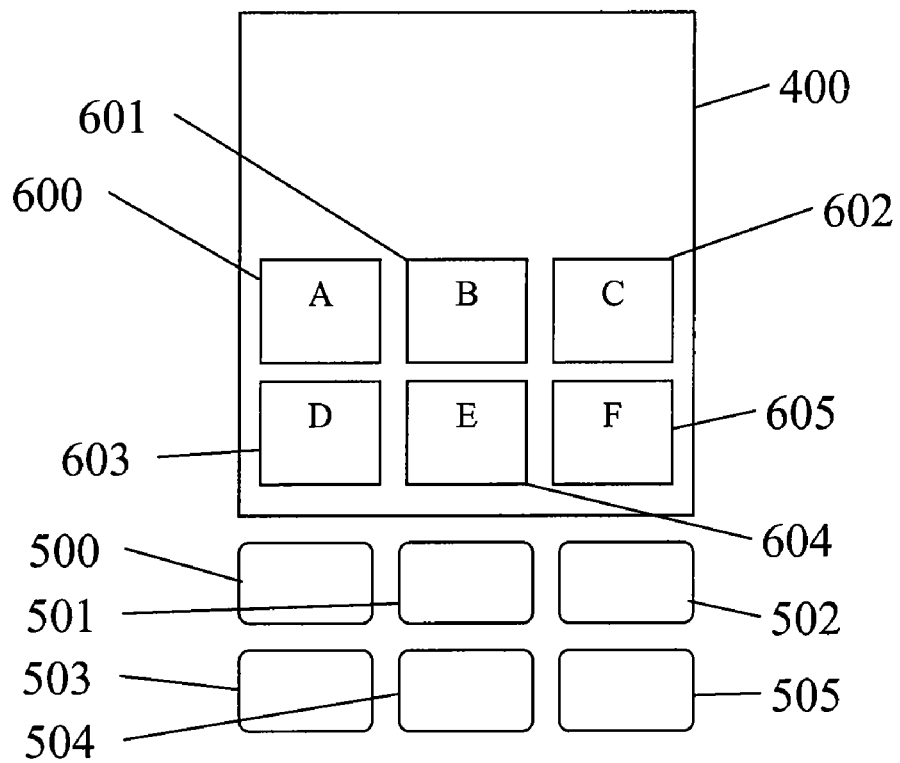
FIG. 7 shows an implementation of the second character-set array to type English letters after pressing button 500.

FIG. 7 shows an implementation of the second character-set array to type English letters after pressing button 500 in FIG. 1. In this example, each second character-set has exactly one member.

Figure 8:
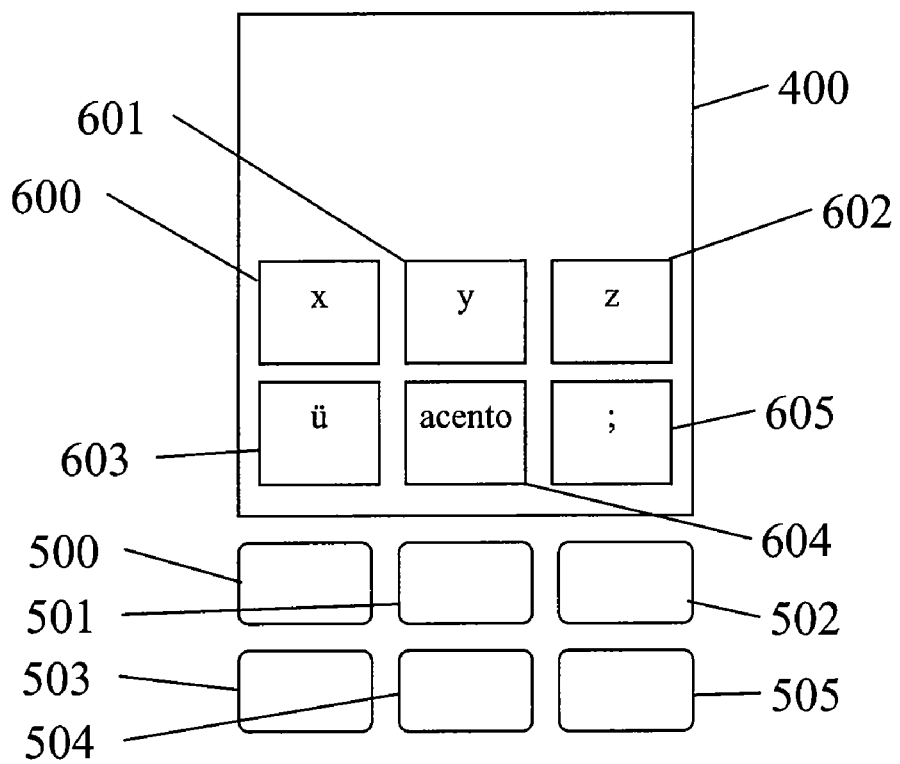
FIG. 8 shows an implementation of the second character-set array to type Spanish letters and various symbols after pressing button 504.

FIG. 8 shows an implementation of the second character-set array to type Spanish letters and various symbols after pressing button 504 in FIG. 2. Here, except for icon 604, each second character-set has exactly one member. Icon 604 has the label "acento" and selecting it via pressing the 504 key on the physical keypad interface takes the user to a third character-set array shown in FIG. 9.

Figure 9:
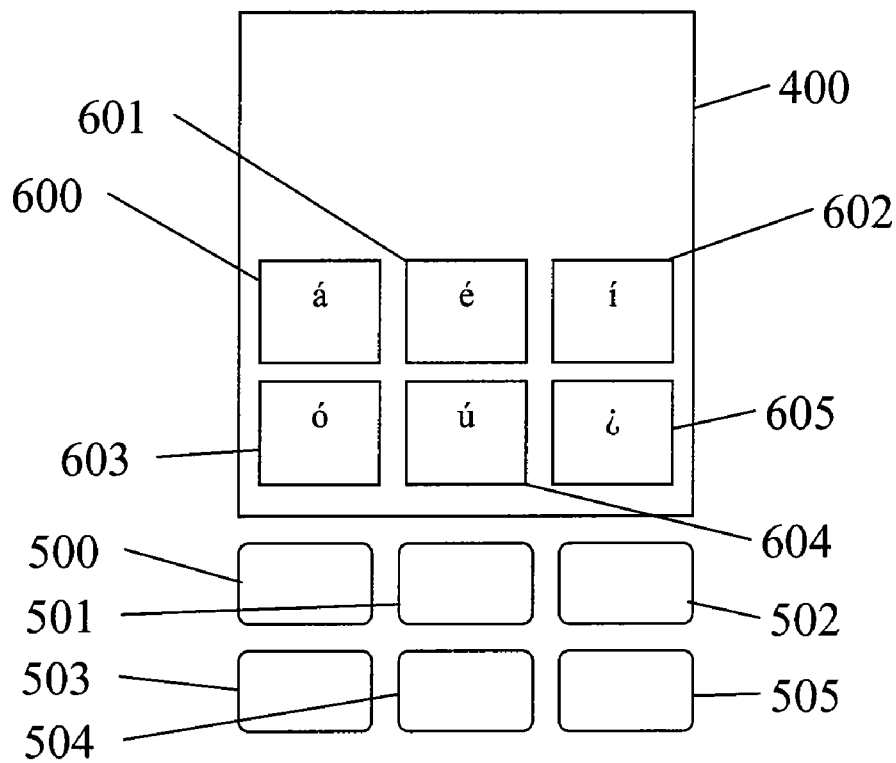
FIG. 9 shows an implementation of the third character-set array to type Spanish letters and various symbols after pressing button 504 twice.

FIG. 9 shows an implementation of the third character-set array to type unique Spanish letters and various symbols after pressing button 504 twice. Here, each second character-set has exactly one member.

Figure 10:
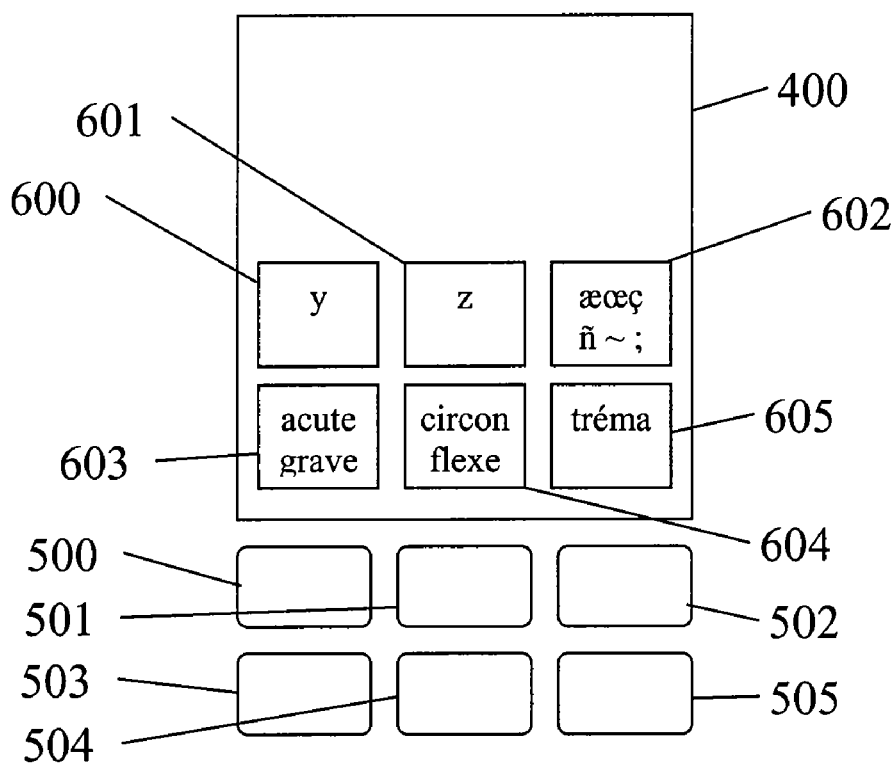
FIG. 10 shows an implementation of the second character-set array to type French letters and various symbols after pressing button 504.

FIG. 10 shows an implementation of the second character-set array to type French letters and various symbols after pressing button 504 in FIG. 3. Two character-sets consist of one member each. Selecting other character-sets lead to third character sets.

Figure 11:
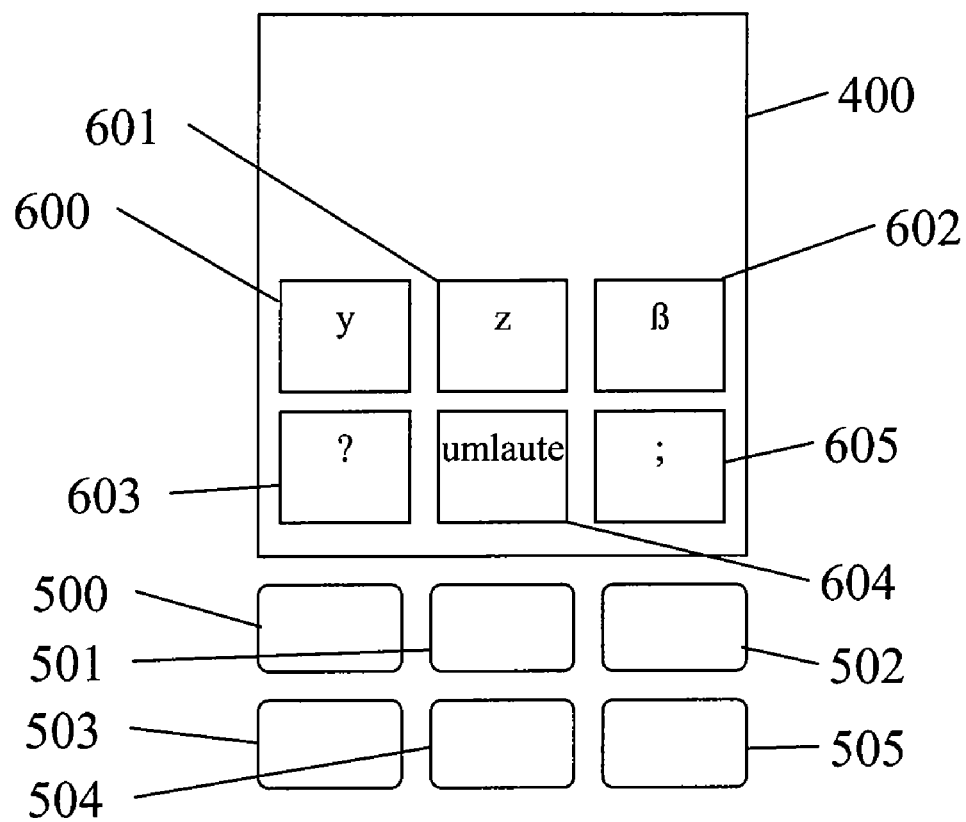
FIG. 11 shows an implementation of the second character-set array to type German letters and various symbols after pressing button 504.

FIG. 11 shows an implementation of the second character-set array to type German letters and various symbols after pressing button 504 in FIG. 4. Here, except for 604, each second character-set has exactly one member. Icon 604 has the label "umlaut" and selecting it via pressing 504 leads to a third character-set array. This is an example of further nesting of arrays. If upon receiving a second user selection from the keypad to select one of the characters mapped to the second user selection, more than one character remains, the device then populates the onscreen array with a plurality of characters from the selected one of the character sets as elements of the onscreen array; and receives a third user selection from the keypad to select one of the characters mapped to the third user selection as the input character. Sequential key selection drills down through nested arrays and is not necessarily limited by 2 or 3 inputs.

Figure 12:
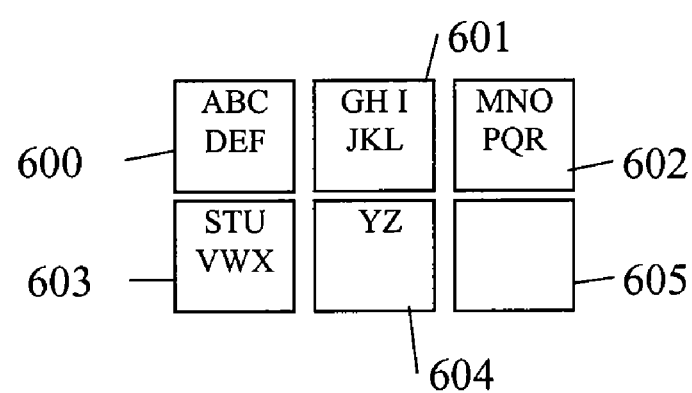
FIG. 12 shows an implementation of the English alphabet arranged on display 400 in sequential order and the convention for reading directions of the English language (left to right and top to bottom).

FIG. 12 shows the encoding of the English alphabet in accordance with the convention for reading directions of English on the keypad image on the screen showing six icons arranged as an array (600-605).

Figure 13:
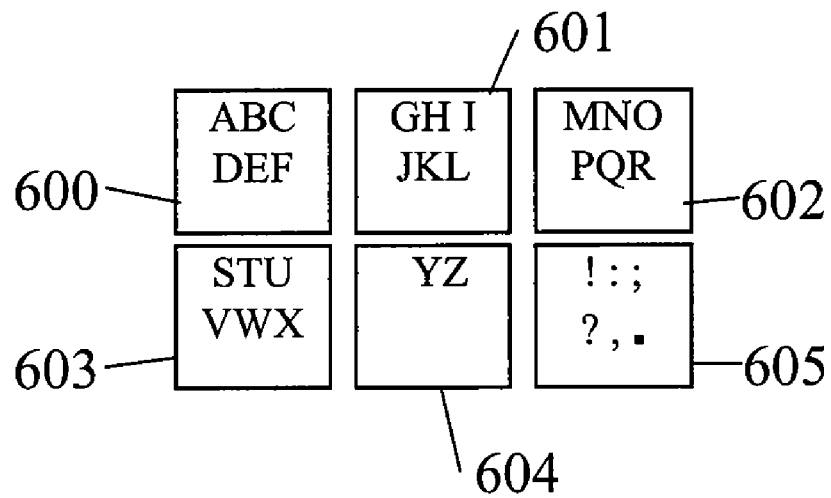
FIG. 13 shows an implementation of the English alphabet arranged on display 400 with punctuation separately grouped on its own button.

FIG. 13 shows the encoding of the English alphabet in accordance with the convention for reading directions of English, further including punctuation grouped together on the keypad image on the screen showing six icons arranged as an array (600-605).

Figure 14:
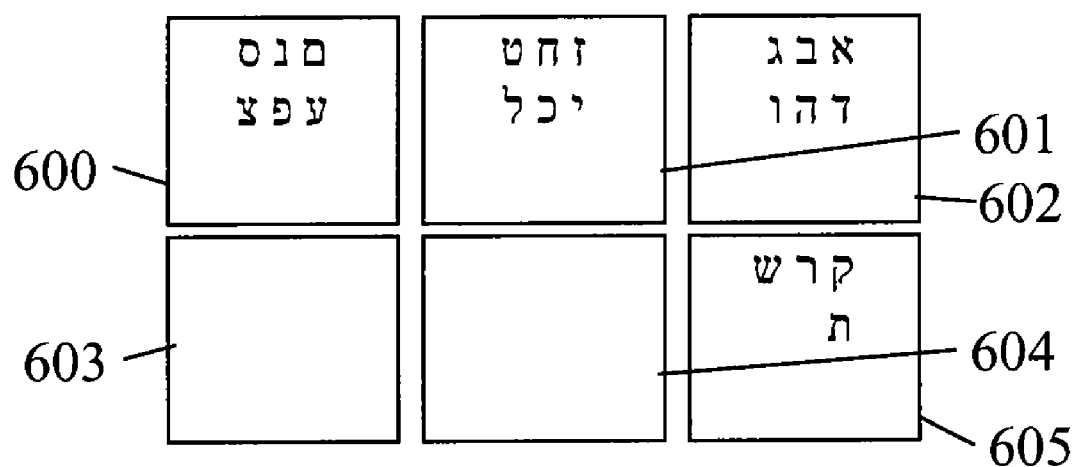
FIG. 14 shows an implementation arranged on display 400 where the convention for reading directions is different from that in English, namely Hebrew where the text is from right to left, top to bottom.

FIG. 14 is an encoding example of a language where the convention for reading directions is different from that in English on the keypad image on the screen showing six icons arranged as an array (600-605). As reading of Hebrew text is from right to left then from top to bottom, aleph (א), the first letter of the alphabet is on the third character-set of the first row. The arrangement of letters on a character-set also follow the right to left then top to bottom usage, hence the letter beth (ב) is on the left of the letter aleph. To follow the right to left convention, zayin (ז), the seventh letter of the alphabet, is on the second character-set of the first row. Other letters are similarly arranged.

Other key arrangements shown in co-pending U.S. application Ser. No. 11/383,605 and incorporated herein by reference may be utilized on the onscreen array in accordance with the present invention. The physical buttons may or may not include the key arrangements printed thereon.

A unique advantage to the present invention is that the displayed characters can be programmed in accordance with the various character arrays without having to change the physical keypad markings. The user can associate what is shown on the display (keypad image) with where his fingers should be positioned on the physical keypad interface, without ever having to look at the physical keypad (similar to knowing where to move a mouse or graphical pen by associating where the pointer is on the display screen and not looking at the mouse/pen).

This invention is applicable to all languages and writing scripts and should not inferred from the figures as limited to only English, Spanish, French, German alphabets and mathematical symbols. The order and/or selection of languages is not limited to that shown in FIG. 6.

In addition to the 6-key arrangements shown (e.g., portable music players have about six buttons), the invention may utilize more or less keys as needed for the particular implementation. For example, in a 9-key embodiment, the keypad image includes up to nine keys arranged in three columns and three rows mapped to nine keys of the physical keypad interface. In a 12-key embodiment (e.g., standard phone keypad), the keypad image includes up to twelve keys arranged in three columns and four rows (or otherwise) mapped to twelve keys of the physical keypad interface. The twelve keys can be arranged to correspond to a standard phone keypad with numeric buttons and asterisk and pound buttons in their respective locations on the keypad array, the standard phone keypad separately accessible.

Although the physical keypads described herein are generally in the context of a plurality of keys, the term physical keypad may also be used equally in the context of a touch-screen or other touch-type keyboards. The keys need not necessarily be arranged exactly in an array (rows and columns) but other layouts are contemplated herein where the onscreen array layout essentially mimics part or all of the keypad layout.

The device may include a large or small screen as known in the art. The display screen may include gray-scale or color (such as an LCD).

The present invention can be adapted for portable devices such as a personal digital assistant, a portable computer, a digital camera or other electronic devices provided with keypad buttons (e.g., mobile phones, music players, IPod® devices, and the like). The housing for the device may be elongated vertically, or may take on other sizes and shapes, including a clamshell housing structure where the physical keypad is separated by a hinge from the display screen, among other structures. The keyboard may include well-known mode selection keys, or other hardware or software for switching between text entry and telephony entry. The output device shown in the examples is a display, which is preferably a full graphic LCD. Other types of output devices may alternatively be utilized. The output device may display the output so a user can visually see what characters are being selected and include tones, etc. A processing device is contained within the housing of the device and is coupled between the physical keyboard interface and the display. The processing device controls the operation of the display, as well as the overall operation of the device, in response to actuation of keys on the by the user.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, or device. The computer program product and any software and hardware described herein form the various means for carrying out the functions of the invention in the example embodiments.

The invention claimed is:

1. A device for receiving an input character from a user, comprising
   - a keypad comprising a plurality of keys arranged in rows and columns forming a keypad array;
   - a display operable to display an onscreen array;
   - a selection interface for accessing a plurality of nested arrays to be displayed as the onscreen array when selected, each nested array comprising a plurality of elements arranged in rows and columns in a pattern corresponding to the location of the keys on the keypad, wherein each element of the onscreen array is coordinately mapped according to the pattern to a corresponding key in the keypad array and not displayed on the keypad itself;
   - a language mode selection interface displayed on a first onscreen array for switching between different languages, said interface comprising a plurality of language mode selections displayed as elements of the onscreen array and mapped to the corresponding key in the keypad array for user selection from the keypad, and wherein each language mode selection is associated with its respective character set and characters nested thereunder;
   - a nested character selection interface for each language mode selection which displays as elements of the onscreen array a second onscreen array of nested character sets and, upon further selection, a third onscreen array of nested characters of the alphabet of the language and mapped to the corresponding key in the keypad array for user selection from the keypad;
   - a processor for receiving a selection of the plurality of nested arrays by first receiving a first user language selection from the language mode selection interface and for thereafter receiving one or more input characters from the nested character selection interface by
     - populating the second onscreen array with a plurality of nested character sets as elements of the second onscreen array, wherein each element comprises a character set which comprises a plurality of characters;
     - receiving a second user selection from the keypad to select one of the nested character sets from the second onscreen array mapped to second user selection;
     - re-populating the onscreen array with a plurality of nested characters from the selected one of the nested character sets as elements of the third onscreen array, wherein each element comprises a single character from the selected character set; and
     - receiving a third user selection from the keypad to select one of the nested characters from the third onscreen array mapped to the third user selection as the input character.

2. The device of claim 1 wherein the onscreen array is graphically designed to simulate an image of a keypad having buttons to represent the elements of the onscreen array.

3. The device of claim 1 wherein the each element of the onscreen array is coordinately mapped to only some of the keys available on the keypad.

4. The device of claim 1 wherein the onscreen array comprises up to six elements arranged in three columns and two rows.

5. The device of claim 4 wherein each of the plurality of character sets in the onscreen array comprise up to six characters arranged in three columns and two rows.

6. The device of claim 1 further comprising at least one character set corresponding to functions in addition to characters of the alphabet of the language.

7. The device of claim 1 wherein the processor selectively populates the onscreen array with a plurality of language mode selections as elements of the onscreen array, and receives input from the keypad to select one of the language mode selections mapped to the received input.

8. The device of claim 1 wherein the characters and character sets for each language are populated in the onscreen array in accordance with a convention for reading directions of the language.

9. The device of claim 1 wherein the onscreen array comprises only a portion of the display.

10. The device of claim 1 wherein the input character is output to the display.

11. The device of claim 1 further comprising a pre-selection mode wherein the processor temporarily outputs to the display, upon receiving a pre-selection input from the keypad, a visual indication of which element of the onscreen array is mapped to the corresponding key being pre-selected prior to receiving the actual user selection from the keypad, wherein the pre-selection input comprises an input to the keypad distinguishable from the user selection to provide a visual cue to the user regarding the element.

12. The device of claim 11 wherein the pre-selection input is distinguishable from the user selection based on key pressure.

13. The device of claim 11 wherein the pre-selection indication comprises a visual effect indicating which element of the onscreen array is coordinately mapped to the corresponding key in the keypad array for which the pre-selection input was received.

14. The device of claim 1 wherein the processor further provides predictive text functionality that provides a list of possible words that match the input characters being selected by the user by displaying one or more text prediction icons to the user as probable choices and allowing user selection of one of the text prediction icons by coordinately mapping the icons to a corresponding key on the keypad array.

15. The device of claim 14 wherein the processor outputs a pre-selection indication upon receiving a pre-selection input from the keypad corresponding to the user selection of one of the text prediction icons, by temporarily outputting to the display a visual indication of which text prediction icon of the onscreen array is mapped to the corresponding key being pre-selected prior to receiving the actual user selection from the keypad, wherein the pre-selection input comprises an input to the keypad distinguishable from the user selection to provide a visual cue to the user regarding the text prediction icon.

16. The device of claim 1 wherein, if upon receiving a second user selection from the keypad to select one of the characters mapped to the second user selection, more than one character remains, populating the onscreen array with a plurality of characters from the selected one of the character sets as elements of the onscreen array; and receiving a third user selection from the keypad to select one of the characters mapped to the third user selection as the input character.

17. A method for receiving an input character from a user, comprising
   - providing a keypad comprising a plurality of keys arranged in rows and columns forming a keypad array;
   - displaying an onscreen array comprising a plurality of elements arranged in rows and columns in a pattern corresponding to the location of the keys on the keypad, wherein each element of the onscreen array is coordinately mapped according to the pattern to a corresponding key in the keypad array and not displayed on the keypad itself; wherein the display comprises at least two interface modes comprising, (a) a language mode selection interface displayed on a first onscreen array for switching between different languages, said interface comprising a plurality of language mode selections displayed as elements of the onscreen array and mapped to the corresponding key in the keypad array for user selection from the keypad, wherein each language mode selection is associated with its respective character set and characters nested thereunder; and (b) a nested character selection interface for each language mode selection which displays as elements of the onscreen array a second onscreen array of nested character sets and, upon further selection, a third onscreen array of nested characters of the alphabet of the language and mapped to the corresponding key in the keypad array for user selection from the keypad;

receiving a selection of the plurality of nested arrays by first receiving a first user language selection from the language mode selection interface and thereafter receiving one or more an input characters by populating the second onscreen array with a plurality of nested character sets as elements of the second onscreen array, wherein each element comprises a character set which comprises a plurality of characters;

receiving a second user selection from the keypad to select one of the nested character sets from the second onscreen array mapped to the second user selection;

populating the onscreen array with a plurality of nested characters from the selected one of the nested character sets as elements of the third onscreen array wherein each element comprises a single character from the selected character set; and receiving a third user selection from the keypad to select one of the nested characters from the third onscreen array mapped to the third user selection as the input character.

18. The method of claim 17 further comprising at least one character set corresponding to functions in addition to characters of the alphabet of the language.

19. The method of claim 18 wherein the characters and character sets for each language are populated in the onscreen array in accordance with a convention for reading directions of the language.

20. The method of claim 17 further comprising temporarily outputting to the display, upon receiving a pre-selection input from the keypad, a visual indication of which element of the onscreen array is mapped to the corresponding key being pre-selected prior to receiving the actual user selection from the keypad, wherein the pre-selection input comprises an input to the keypad distinguishable from the user selection to provide a visual cue to the user regarding the element.

21. The method of claim 17 further comprising predictive text functionality that provides a list of possible words that match the input characters being selected by the user comprising displaying one or more text prediction icons to the user as probable choices and allowing user selection of one of the text prediction icons by coordinately mapping the icons to a corresponding key on the keypad array.

22. A computer program product for receiving an input character from a user, the computer program product comprising a computer readable storage medium and a computer program mechanism embedded therein, the computer program mechanism comprising instructions for displaying an onscreen array comprising a plurality of elements arranged in rows and columns in a pattern corresponding to the location of the keys on the keypad, wherein each element of the onscreen array is coordinately mapped according to the pattern to a corresponding key in the keypad array and not displayed on the keypad itself; wherein the display comprises at least two interface modes comprising, (a) a language mode selection interface displayed on a first onscreen array for switching between different languages, said interface comprising a plurality of language mode selections displayed as elements of the onscreen array and mapped to the corresponding key in the keypad array for user selection from the keypad, wherein each language mode selection is associated with its respective character set and characters nested thereunder; and (b) a nested character selection interface for each language mode selection which displays as elements of the onscreen array a second onscreen array of nested character sets and, upon further selection, a third onscreen array of nested characters of the alphabet of the language and mapped to the corresponding key in the keypad array for user selection from the keypad;

receiving a selection of the plurality of nested arrays by first receiving a first user language selection from the language mode selection interface and thereafter receiving one or more an input characters by populating the second onscreen array with a plurality of nested character sets as elements of the second onscreen array, wherein each element comprises a character set which comprises a plurality of characters;

receiving a second user selection from the keypad to select one of the nested character sets from the second onscreen array mapped to the second user selection;

populating the onscreen array with a plurality of nested characters from the selected one of the nested character sets as elements of the third onscreen array wherein each element comprises a single character from the selected character set; and receiving a third user selection from the keypad to select one of the nested characters from the third onscreen array mapped to the third user selection as the input character.

23. The computer program product of claim 22 further comprising at least one character set corresponding to functions in addition to characters of the alphabet of the language.

24. The computer program product of claim 23 wherein the characters and character sets for each language are populated in the onscreen array in accordance with a convention for reading directions of the language.

25. The computer program product of claim 22 further comprising temporarily outputting to the display, upon receiving a pre-selection input from the keypad, a visual indication of which element of the onscreen array is mapped to the corresponding key being pre-selected prior to receiving the actual user selection from the keypad, wherein the pre-selection input comprises an input to the keypad distinguishable from the user selection to provide a visual cue to the user regarding the element.

26. The computer program product of claim 22 further comprising predictive text functionality that provides a list of possible words that match the input characters being selected by the user comprising displaying one or more text prediction icons to the user as probable choices and allowing user selection of one of the text prediction icons by coordinately mapping the icons to a corresponding key on the keypad array.

* * * * *